United States Patent
King et al.

[11] Patent Number: 6,129,036
[45] Date of Patent: Oct. 10, 2000

[54] WATER-PRESSURE SENSITIVE DYE RELEASE APPARATUS

[76] Inventors: Lawrence P. King, 8 Edgewood Ct., Colts Neck, N.J. 07722; Matthew G. Reinhart, 16 Nancy Ct., Jackson, N.J. 08527; David M. Thompson, 2501 Corlies Ave., Neptune, N.J. 07753

[21] Appl. No.: 09/323,288

[22] Filed: Jun. 1, 1999

[51] Int. Cl.[7] .............. G01D 21/00; B64B 1/40; B63C 9/13
[52] U.S. Cl. ............ 116/211; 116/206; 116/209; 116/210; 441/80
[58] Field of Search ................. 116/200, 201, 116/209, 211, 212, 206, 210, DIG. 7, DIG. 8, DIG. 9; 2/67; 441/80, 89, 11, 6

[56] References Cited

U.S. PATENT DOCUMENTS

| | | |
|---|---|---|
| 827,350 | 7/1906 | Crofford .................................. 116/210 |
| 3,049,091 | 8/1962 | Carroll et al. ........................... 116/211 |
| 3,280,549 | 10/1966 | Hsu ........................................... 116/211 |
| 3,768,436 | 10/1973 | Martini ..................................... 116/211 |
| 4,080,677 | 3/1978 | Koehler .................................... 116/211 |
| 4,185,582 | 1/1980 | Bryant ...................................... 116/210 |
| 4,527,504 | 7/1985 | Byerley .................................... 116/211 |

*Primary Examiner*—Diego Gutierrez
*Assistant Examiner*—Faye Francis
*Attorney, Agent, or Firm*—Charles I. Brodsky

[57] ABSTRACT

A swimmer's safety device including a casing having a top surface with a plurality of perforations to allow water to enter once submerged, and having a deflectable membrane along with a plunger to penetrate a dye material and puncture a rupturable bottom surface to release the dye into the water, once the casing is submerged to a depth predetermined aforehand, and for a time interval set in accordance with the skills of the swimmer, as well. The casing, in accordance with the invention, could be incorporated as part of a swimsuit construction, could be temporarily secured to the swimsuit of a wearer, or could be worn as a swimsuit accessory as a wristband, armband, headband, or necklace.

14 Claims, 1 Drawing Sheet

WATER-PRESSURE SENSITIVE DYE RELEASE APPARATUS

FIELD OF THE INVENTION

This invention relates to swimmer's safety devices, in general, and to such a device for providing an alarm alert when a swimmer or other user is submerged in a body of water, in particular.

BACKGROUND OF THE INVENTION

As is known, lifeguards or other security personnel at community swimming pools and water parks are not always able to spot a swimmer in difficulty, especially when the swim facility is well populated. Similarly, at beaches, the lifeguards on duty may not be able to spot a swimmer (or a surfer, for that matter) in distress where the beach is crowded. Oftentimes, the body of a swimmer at the community pool or at the water park is not discovered until minutes, or even hours later lying near the bottom, when the pool is being drained or otherwise cleaned. Frequently, the body of the swimmer or surfer at the beach is not found until it is washed ashore at a later time.

As will be understood, not every drowning person using these facilities can be saved. However, by being able to quickly retrieve a submerging person, the chance of resuscitating and/or reviving the drowning person is greatly enhanced. In accordance with this recognition, it will therefore become apparent that a need exists to enable the submerged swimmer or surfer to be quickly and easily spotted so that appropriate life-saving routines can be carried out.

SUMMARY OF THE INVENTION

As will become clear from the following description, the present invention proceeds upon the realization that people of different age, and of different skill abilities are often under water for differing periods of time, in accordance with their swim activities. Thus, an accomplished swimmer may free-dive without breathing apparatus to a depth far beyond that to which an average swimmer might try to go in just picking something up from the bottom of a pool, or from a lake or ocean-bed for example. In like manner, an average adult swimmer most probably could hold his/her breath under water for a longer period of time than can a child. A novice swimmer—or one who does not know how to swim, or is a toddler, on the other hand—would probably not be able to hold its breath for any period of time, when submerged at any depth. Recognizing the existence of these differences in age and/or ability, the present invention proceeds as a swimmer's safety device, in the nature of a water-pressure sensitive dye release apparatus to provide a visual alarm alert to a lifeguard, to other securing personnel, and to anyone in the immediate area that a person has submerged in a body of water, to a given depth, and for a certain period of time.

In particular, and in accordance with a preferred embodiment of the invention, the swimmer's safety device includes a casing having top, bottom and side surfaces, along with a deflectable membrane within the casing adjacent to its top surface. A dye material—included within a pack or otherwise—is also included within the casing, adjacent to its bottom surface. In accordance with the invention, a plurality of perforations are provided within the top surface, of a size and number to permit measured amounts of liquid to enter at a controlled rate according to the depth the casing is submerged within a body of water.

With the casing incorporated, for example, in a swimsuit construction, or when it is temporarily secured to the swimsuit of a wearer, or even when the casing is just worn as a separate swimsuit accessory as a necklace, bracelet or arm band, the casing of the invention also includes a plunger coupled with the deflectable membrane, and aligned in a direction towards the dye material. With the bottom surface of the casing being rupturable, as will be seen, submerging the casing to a predetermined depth within the body of water leads to an ensuing water pressure being exerted upon the membrane, to deform and deflect it an amount to penetrate the plunger through the dye material and to puncture the bottom surface of the casing in releasing the dye material into the water as the visual alert.

As will also be seen, the swimmer's safety device of this embodiment utilizes a membrane which is initially biased to a given curvature, and of a resilient composition, so as to return the membrane to its initial position upon the raising of the casing from its submerged depth, as when the swimmer dives to a depth close to the prescribed limit, but then begins to surface before the dye activation has taken place. In this respect, the membrane is preferably positioned adjacent to the top surface of the casing so as to propel the entered water back out through the perforations in starting the timing process anew.

As will be readily apparent to the skilled artisan, by selecting the size of the perforations and their number—as well as by selecting the composition of the membrane material—, the puncturing of the dye pack and the ensuing rupturing of the bottom surface of the casing can all be selected in establishing that length of time that the casing is submerged, and to that selected depth, before the visual alert is given by the releasing dye. In this manner, a swimmer's safety device could be incorporated in the swimsuit construction, or as a clothing clip-on to the swimsuit, in providing a visual alert just a matter of seconds after a novice or non-swimmer should happen to fall into a body of water of only nominal depth—whereas, for an average or accomplished swimmer, the visual alert would not be provided until the casing is submerged to a greater depth, and/or maintained there for a longer period of time.

In accordance with a second embodiment of the invention, a compressed gas is added in the space between the deflectable membrane and the bottom surface of the casing—as well as the addition of a further self-sealing second membrane adjacent to at least one of the side surfaces of the casing, for instance, in injecting the compressed gas initially, and to then close up the casing. As will be understood, the compressed gas, in this embodiment, serves to "blow-out" the dye material faster upon the rupturing of the bottom surface by the puncturing plunger.

In another embodiment of the invention, on the other hand, an initially collapsed balloon is included in the space between the deflectable membrane and the bottom surface of the casing, lined with a chemical (such as magnesium) to inflate the balloon when reacting with water entering by way of the rupture—to be released along with the dye mixture. Besides providing this added visual alert, the balloon can be retained in its initial location once so deployed, through the use of a tether securing the balloon to the casing in centering the position of the drowning person.

In carrying out these teachings, the deflectable membrane of the invention may be composed of an elastomeric material. The top surface of the casing in such embodiment may be composed of a hydrophobic material. The casing, itself, may be composed of a petroleum based material. With these constructions, it will be recognized that the perforations in the casing are of a size and quantity to cooperate with the membrane selected in controlling the rate at which water enters into the casing upon being submerged to a varying depth, and in directing the rupture of the bottom surface in releasing the dye material—either as a dry powder to mix with the water, or as a liquid solution itself. In this way, the visual indication is given that a swimmer or surfer has submerged to a depth and/or for a given time as prescribed for that person based upon his/her age and/or swim ability.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

Figure 1:
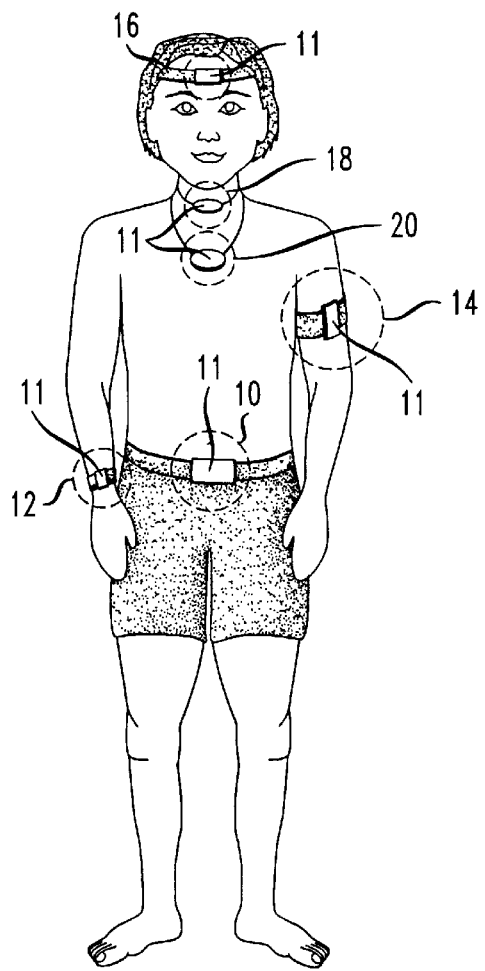
FIG. 1 is an illustration depicting possible different ways in which the water-pressure sensitive dye release swimmer's safety device of the invention may be worn.

In FIG. 1, the various possible locations for the wearing of the dye-pack, life saving device are indicated at the circled areas, as being incorporated in a swimsuit construction at a belt area 10, (or temporarily clipped or secured there), or as any one of several body accessories coordinated with the swimsuit—for example, a wristband 12, an armband 14, a headband 16, a choker-type necklace 18, or other necklace 20. The device included (shown at 11) need only be of a size to hold a sufficient amount of dye to color a surface area of some 5–10 feet in diameter—and if a balloon display were to be employed, to house a collapsed balloon to expand to a diameter of some 6–12" once inflated.

Figure 2:
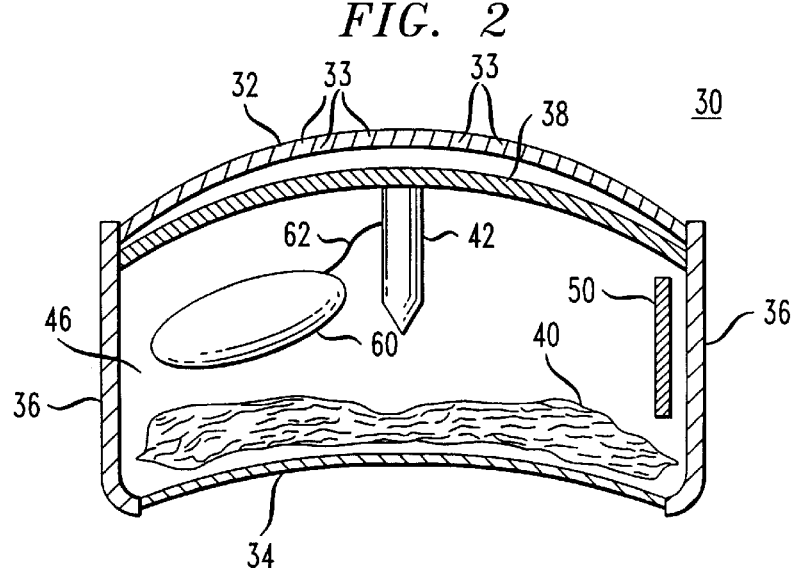
FIG. 2 is a sectional view of the swimmer's safety device in accordance with the invention.

In FIG. 2, the cross-sectional view of the casing 30 is shown as having top, bottom and side surfaces 32, 34 and 36 respectively. A deflectable membrane 38, of elastomeric material for example, is included within the casing 30, adjacent to its top surface 32. A dye material, preferably included within its own encompassing pack, is shown at 40, adjacent to the bottom surface 34. The top surface 30—composed of a hydrophobic material—includes a plurality of perforations 33 of size and number to permit measured amounts of liquid to enter at the controlled rate for each individual user, in accordance with the depth the casing is intended to be submerged within the body of water, before the alarm alert is visually provided. As shown, a plunger 42 is coupled with the membrane 38, and aligned with it in a direction extending towards the dye-pack 40. As previously mentioned, the bottom surface 34 is rupturable, and may be composed of plastic, stainless steel or bronze, for example.

In use, as the casing 30 worn by the user is submerged within the body of water towards the permitted depth, the ensuing water pressure caused by the entry of the water through the perforations in the top surface 32 exerts a pressure on the membrane 38 sufficient to deflect it from its initial curvature, in moving the plunger 42 downwardly. Where the submerged depth is less than the alleged depth for the casing, the plunger movement is insufficient to rupture the bottom surface 34, even if the movement were sufficient to puncture and penetrate the dye-pack 40. If, thereafter, the swimmer rises from that depth, the membrane 38 reverts back toward its original position, pushing the water accumulated back out through the perforations. However, once the depth of submersion reaches that which is predetermined for the casing in question, the ensuing pressure exerted upon the membrane 38 by the water which enters the perforations causes the plunger 42 to become operative in not only penetrating the dye-pack 40, but in rupturing the bottom surface 34 in releasing the dye as the alarm alert. As will be appreciated, once released, the dye visualization continues, even if the wearer were to thereafter rise towards the water's surface.

FIG. 2 also illustrates a chamber 46 between the membrane 38 and the bottom surface 34 into which a compressed gas may be injected—as by means of a syringe, for example, through the side surfaces 36 and an included self-sealing membrane 50. The compressed gas, when injected, fills the chamber 46, with the membrane 50 being self-sealing to secure the compressed gas upon withdrawal of the syringe tip. Such compressed gas—e.g. helium, or carbon dioxide—serves to provide a further pressure upon the dye-pack 40, to essentially "blow-out" the dye material through the rupture in the bottom surface 34 caused by the puncturing plunger 42. As will be understood, this serves to deploy the dye material as a visual alert to the lifeguard, the other security personnel, or just the surrounding populace, that much faster.

As FIG. 2 further illustrates, a collapsed balloon 60 may also be included in the space between the deflectable membrane 38 and the bottom surface 34. The inside of the balloon 60 could be lined with any appropriate chemical sufficient to "explode" upon contact with water, such as magnesium. As the dye material is released through the puncturing of the surface 34, the water which then enters mixes with the chemical lining of the balloon, forcing the balloon to inflate and propelling it through the rupture opening, into the water, and eventually to its surface. To retain the balloon 60 in position, centered about the submerged wearer, a tether 62 is indicated, which can be secured either to the plunger 42, or to any appropriate point in the casing 30.

With this construction, as with the construction where the balloon and tether arrangement are not employed, the water pressure at the depth to which the casing extends continues sufficient to penetrate the plunger 42 through the dye material 40, and out the ruptured bottom surface in allowing the visual alert to be given. In this manner, for example, where every foot depth of water exerts a pressure of substantially 0.43 psi, the perforations in the top surface 32 could be selected of a size and number so as to set off the visual dye display when submerged to a depth of 3 feet, for example, and held there for 20 seconds—as might be the situation of a toddler being submerged in a wading pool. On the other hand, for an accomplished swimmer, the size of the perforations and their number might be selected with the membrane being used so as not to provoke the visual alert until submerged to a depth of 6 feet, for a length of time of 45 seconds, as an illustration. Once the visual alert is provided, immediate steps can be undertaken to rescue the wearer of the swimmer's safety device. In this respect, the casing 30, in carrying out the invention, can be fabricated of a petroleum-based polyethylene, polypropylene or vinyl material.

While there have been described what are considered to be preferred embodiments of the present invention, it will be readily appreciated by those skilled in the art that modifications can be made without departing from the scope of the teachings herein. Thus, while the invention has been described in the context of having the water which sets off the alarm enter through the top of the casing, it will be appreciated not to be necessary for the water to enter at that point, as the water could just as well enter from the sides, since at the depth in question, the water pressure from above and from the sides are substantially the same—just as they are at the bottom surface of the casing; as will be understood, all that would be required is to have a plunger movable to penetrate the dye material at that depth, and in puncturing the bottom surface of the casing, in releasing the dye visualization, no matter how the water may enter the casing. For at least such reasons, therefore, resort should be had to the claims appended hereto for a true understanding of the scope of the invention.

We claim:

1. A swimmer's safety device comprising:

a casing having top, bottom and side surfaces;

a deflectable membrane within said casing adjacent said top surface;

a dye material within said casing adjacent said bottom surface;

a plurality of perforations within said top surface of size and number to permit measured amounts of liquid to enter said top surface at a controlled rate in accordance with the depth said casing is submerged within a body of water;

a plunger coupled with said membrane, aligned in a direction towards said dye material;

and with said bottom surface of said casing being rupturable;

whereby upon said casing being submerged to a predetermined depth within said body of water, a ensuing water pressure exerted upon said membrane becomes operative to deflect said membrane and said plunger an amount to penetrate said dye material and puncture through said bottom surface of said casing in releasing the dye material into said body of water as a visual alarm alert.

2. The swimmer's safety device of claim 1 wherein said dye material is enclosed within a pack puncturable by said plunger prior to penetration through said bottom surface of said casing.

3. The swimmer's safety device of claim 1 wherein said membrane is initially biased to a given curvature, and of a resilient composition, to return to said given curvature upon the raising of said casing from a submerged depth less than said predetermined depth.

4. The swimmer's safety device of claim 3 also including a quantity of compressed gas between said deflectable membrane and said bottom surface of said casing.

5. The swimmer's safety device of claim 4 further including a self-sealing membrane adjacent at least one of said side surface of said casing for injecting said compressed gas between said deflectable membrane and said bottom surface of said casing.

6. The swimmer's safety device of claim 4 further including an initially collapsed balloon between said deflectable member and said bottom surface of said casing, with said balloon initially lined with chemical to inflate said balloon when reacting with water.

7. The swimmer's safety device of claim 6 also including a tether securing said balloon, once inflated, to said casing.

8. The swimmer's safety device of claim 3 wherein said deflectable membrane is composed of an elastomeric material.

9. The swimmer's safety device of claim 3 wherein said top surface of said casing is composed of a hydrophobic material.

10. The swimmer's safety device of claim 3 wherein said casing is composed of a petroleum-based material.

11. The swimmer's safety device of claim 3 wherein said casing is incorporated within a swimsuit construction.

12. The swimmer's safety device of claim 3 wherein said casing is temporarily secured to the swimsuit of a wearer.

13. A swimmer's safety device comprising:

a casing having a rupturable bottom surface;

a dye material within said casing adjacent said bottom surface;

a plunger movable to penetrate said dye material and to rupture said bottom surface of said casing in response to the water pressure at the depth of a body of water into which said casing is submerged;

and a plurality of perforations in said casing of a size and number to control the rate of water entry into said casing upon being submerged to varying depths, and for directing the amount of water entering toward said plunger.

14. The swimmer's safety device of claim 13 wherein said dye material is included within a pack positioned to be penetrated by said plunger when moving to puncture said bottom surface of said casing.

* * * * *